US006393455B1

United States Patent
Eilert et al.

(10) Patent No.: US 6,393,455 B1
(45) Date of Patent: *May 21, 2002

(54) WORKLOAD MANAGEMENT METHOD TO ENHANCE SHARED RESOURCE ACCESS IN A MULTISYSTEM ENVIRONMENT

(75) Inventors: Catherine K. Eilert; Peter B. Yocom, both of Wappingers Falls; Gary M. King, Millbrook; Jeffrey D. Aman, Poughkeepsie, all of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/827,528

(22) Filed: Mar. 28, 1997

(51) Int. Cl.$^7$ ................................................ G06F 9/00
(52) U.S. Cl. ...................................... 709/105; 709/104
(58) Field of Search ................................. 709/100, 101, 709/102, 105, 104, 108, 103, 201, 226, 228; 395/709, 710; 714/48

(56) References Cited

U.S. PATENT DOCUMENTS

| | | | |
|---|---|---|---|
| 3,702,462 A | 11/1972 | England | 340/172.5 |
| 4,177,513 A | 12/1979 | Hoffman et al. | 364/200 |
| 4,858,108 A | 8/1989 | Ogawa et al. | 364/200 |
| 5,008,808 A | 4/1991 | Fries et al. | 364/200 |
| 5,031,089 A * | 7/1991 | Liu et al. | 364/200 |
| 5,220,653 A | 6/1993 | Miro | 395/275 |
| 5,301,323 A | 4/1994 | Maeurer et al. | 395/650 |
| 5,379,381 A | 1/1995 | Lamb | 395/275 |
| 5,416,921 A | 5/1995 | Frey et al. | 395/575 |
| 5,421,011 A * | 5/1995 | Camillone et al. | 709/100 |
| 5,446,737 A * | 8/1995 | Cidon et al. | 370/85.5 |
| 5,452,455 A | 9/1995 | Brown et al. | 395/700 |
| 5,459,864 A | 10/1995 | Brent et al. | 395/650 |
| 5,473,773 A * | 12/1995 | Aman et al. | 709/104 |
| 5,504,894 A * | 4/1996 | Ferguson et al. | 395/650 |
| 5,507,032 A | 4/1996 | Kimura | 395/826 |
| 5,537,542 A | 7/1996 | Eilert et al. | 395/184.01 |
| 5,603,029 A | 2/1997 | Aman et al. | 395/675 |
| 5,675,739 A * | 10/1997 | Eilert et al. | 709/226 |
| 5,819,047 A * | 10/1998 | Bauer et al. | 395/200.59 |

FOREIGN PATENT DOCUMENTS

JP    07-244629    9/1995

* cited by examiner

*Primary Examiner*—Majid Banankhah
(74) *Attorney, Agent, or Firm*—William A. Kinnaman, Jr., Esq.; Heslin & Rothenberg, P.C.; Kevin P. Radigan, Esq.

(57) ABSTRACT

A technique is disclosed for managing a workload distributed across multiple data processing systems to enhance shared resource access to meet a common performance standard. The technique includes on at least one system, measuring performance of the work units on the system to create local performance data, and on at least some of the systems sending the local performance data to at least one other system of the multiple data processing systems. The method further includes on at least one of the systems, receiving the performance data from the sending systems to create remote performance data, and adjusting at least one control parameter for accessing shared resources in response to the local and remote performance data to modify the performance of the work units distributed across the data processing systems to achieve the common performance standard. A dynamic resource clustering process is also employed to enhance the shared resource management.

62 Claims, 12 Drawing Sheets

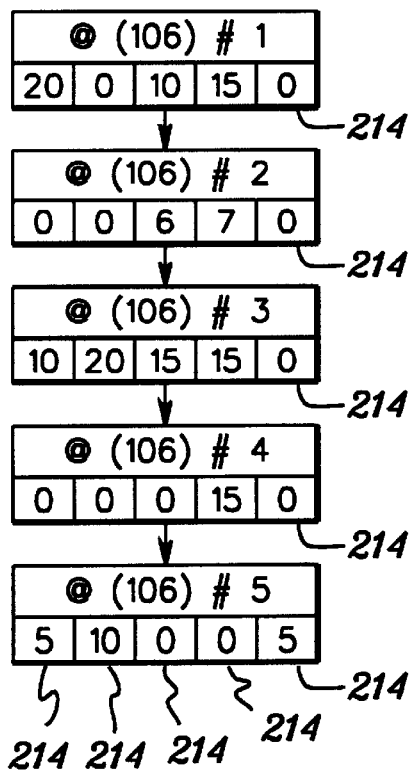
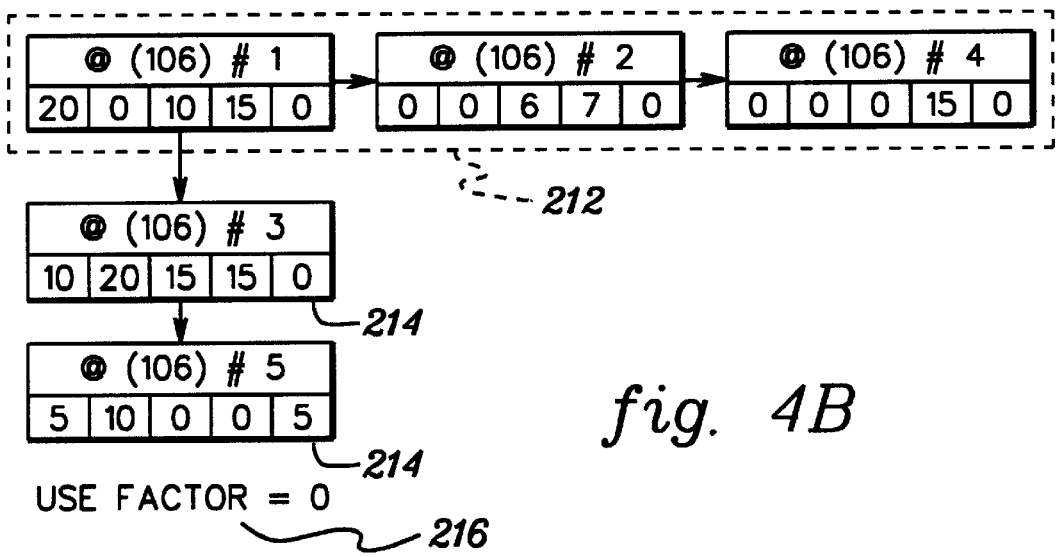
*fig. 4A*
*fig. 4B*
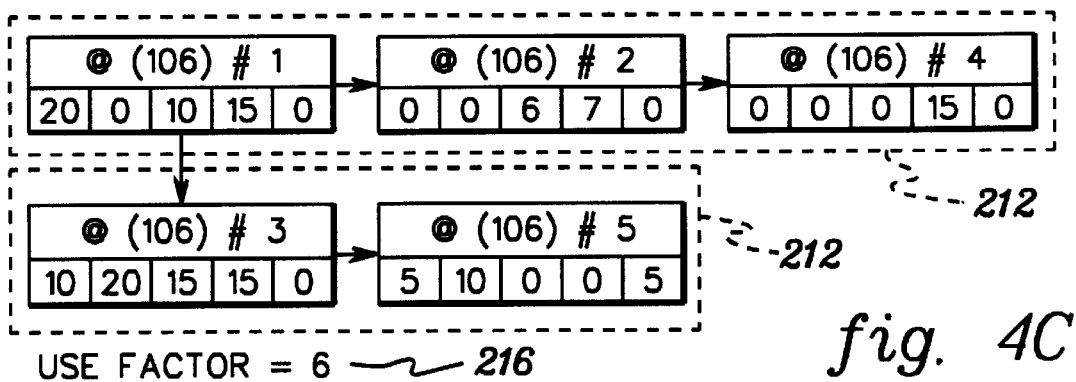
*fig. 4C*

PRIORITY BROADCAST DATA

| CLASS 1 NAME | NEW PRIORITY |
|---|---|
| CLASS 2 NAME | NEW PRIORITY |
| ⋮ | ⋮ |
| CLASS N NAME | NEW PRIORITY |

*fig. 10*

WORKLOAD MANAGEMENT METHOD TO ENHANCE SHARED RESOURCE ACCESS IN A MULTISYSTEM ENVIRONMENT

TECHNICAL FIELD

This invention relates to a method and apparatus for managing resources shared by multiple interconnected, cooperating, independent computer systems to meet performance goals.

BACKGROUND OF THE INVENTION

Workload management is a concept whereby units of work (processes, threads, etc.) that are managed by an operating system are organized into classes (referred to as service classes or goal classes) that are provided system resources in accordance with how well they are meeting predefined goals. Resources are reassigned from a donor class to a receiver class if the improvement in performance of the receiver class resulting from such reassignment exceeds the degradation in performance of the donor class, i.e., there is a net positive effect in performance as determined by predefined performance criteria. Workload management of this type differs from the run-of-the-mill resource management performed by most operating systems in that the assignment of resources is determined not only by its effect on the work units to which the resources are reassigned, but also by its effect on the work units from which they are taken.

Workload managers of this general type are disclosed in the following commonly owned patents and pending patent applications, all of which are incorporated herein by reference:

- U.S. Pat. No. 5,504,894 to D. F. Ferguson et al., entitled "Workload Manager for Achieving Transaction Class Response Time Goals in a Multiprocessing System";
- U.S. Pat. No. 5,473,773 to J. D. Aman et al., entitled "Apparatus and Method for Managing a Data Processing System Workload According to Two or More Distinct Processing Goals";
- U.S. Pat. No. 5,537,542 to C. K. Eilert et al., entitled "Apparatus and Method for Managing a Server Workload According to Client Performance Goals in a Client/Server Data Processing System";
- U.S. Pat. No. 5,603,029, to J. D. Aman et al., entitled "System of Assigning Work Requests Based on Classifying into an Eligible Class Where the Criteria is Goal Oriented and Capacity Information is Available";
- U.S. application Ser. No. 08/383,168, filed Feb. 3, 1995, of C. K. Eilert et al., entitled "Apparatus and Method for Managing a Distributed Data Processing System Workload According to a Plurality of Distinct Processing Goal Types";
- U.S. application Ser. No. 08/383,042, filed Feb. 3, 1995, of C. K. Eilert et al., entitled "Multi-System Resource Capping";
- U.S. application Ser. No. 08/488,374, filed Jun. 7, 1995, of J. D. Aman et al., entitled "Apparatus and Accompanying Method for Assigning Session Requests in a Multi-Server Sysplex Environment".

Of these patents and applications, U.S. Pat. Nos. 5,504,894 and 5,473,773 disclose basic workload management systems. U.S. Pat. No. 5,537,542 discloses a particular application of the workload management system of U.S. Pat. No. 5,473,773 to client/server systems. Applications Ser. Nos. 08/383,168 and 08/383,042 disclose particular applications of the workload management system of U.S. Pat. No. 5,473,773 to multiple interconnected systems. U.S. Pat. No. 5,603,029 relates to the assignment of work requests in a multisystem complex ("sysplex"), while application Ser. No. 08/488,374 relates to the assignment of session requests in such a complex.

As a further extension of the workload managers disclosed in the above-incorporated, commonly owned patents and pending patent applications, a mechanism is needed to manage access to resources shared by multiple systems to meet desired performance goals, and as a particular example, to manage input/output (I/O) priorities to meet performance goals. The present invention is directed to providing such a mechanism.

DISCLOSURE OF THE INVENTION

Briefly described, the present invention relates to a method and apparatus for managing workload across a set of interconnected, cooperating, independent computer systems to meet performance goals. A method/apparatus in accordance with this invention manages a workload comprising work units distributed across the plurality of data processing systems in accordance with a common performance standard. Each of the systems has access to a stored representation of the performance standard and performs assigned work units in accordance with one or more control parameters for accessing shared resources. The invention includes: on each of the systems, measuring performance of the work units on that system to create local performance data; on at least some of the systems, sending the local performance data to at least one other system in the plurality of systems; on at least one of the systems, receiving the performance data from at least one other system of the plurality of systems to create remote performance data; and on that at least one system, responding to the local and remote performance data by adjusting at least one of the control parameters for accessing shared resources to modify the performance of the work units on the systems to achieve the common performance standard.

BRIEF DESCRIPTION OF THE DRAWINGS

The above-described objects, advantages and features of the present invention, as well as others, will be more readily understood from the following detailed description of certain preferred embodiment's of the invention, when considered in conjunction with the accompanying drawings in which:

FIG. 3b is an enlargement of the delay plot information depicted in FIG. 3a;

FIGS. 4a, 4b & 4c depict an example of cluster determination in accordance with the present invention;

FIG. 10 illustrates storage of IO priority broadcast data.

BEST MODE FOR CARRYING OUT THE INVENTION

In accordance with the principles of the present invention, dynamic management capabilities are provided in which work requests have matching shareable resource access priorities on all computer systems of a multisystem. Use of shareable and non-shared resources is sampled on all operating systems in the multisystem and performance data is employed to dynamically manage shared resource use to achieve multisystem-wide goals, as described below. One example of a computer system incorporating and using the dynamic tracking and management capabilities of the present invention is depicted in FIGS. 1–10, and described in detail below.

The figures illustrate the environment and the key features of the present invention for an exemplary embodiment having three interconnected, cooperating computer systems (100-A, 100-B, 100-C), as members of a multisystem. Those skilled in the art will recognize that any number of such interconnected, cooperating computer systems may be used without departing from the spirit or scope of this invention. The three computer systems are executing a distributed workload, and each is controlled by its own copy of an operating system (101) such as the Multiple Virtual Storage ("MVS") operating system offered by International Business Machines Corporation. This is only one example, however. Other operating systems may be used without departing from the spirit or scope of the present invention.

When the description below refers to the "local" system, it means the computer system (100-A, 100-B, 100-C) that is executing the steps being described. The "remote" systems are all the other computer systems being managed in the multisystem environment. Thus, each computer system considers itself local and all other computer systems remote.

Figure 1:
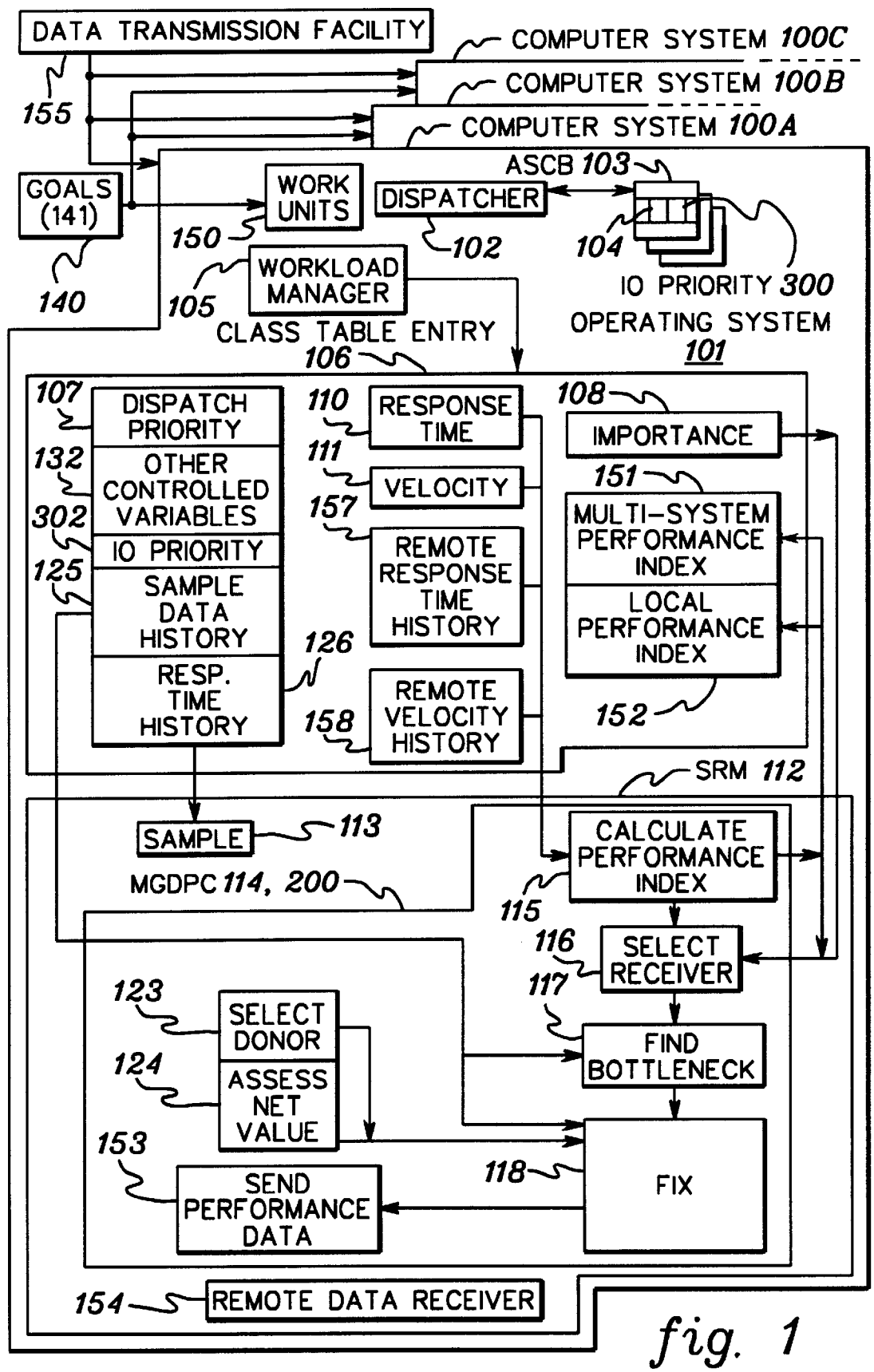
FIG. 1 is a system structure diagram showing a set of computer systems each having a controlling operating system and system resource manager component adapted as described herein in accordance with the present invention.
Figure 2:
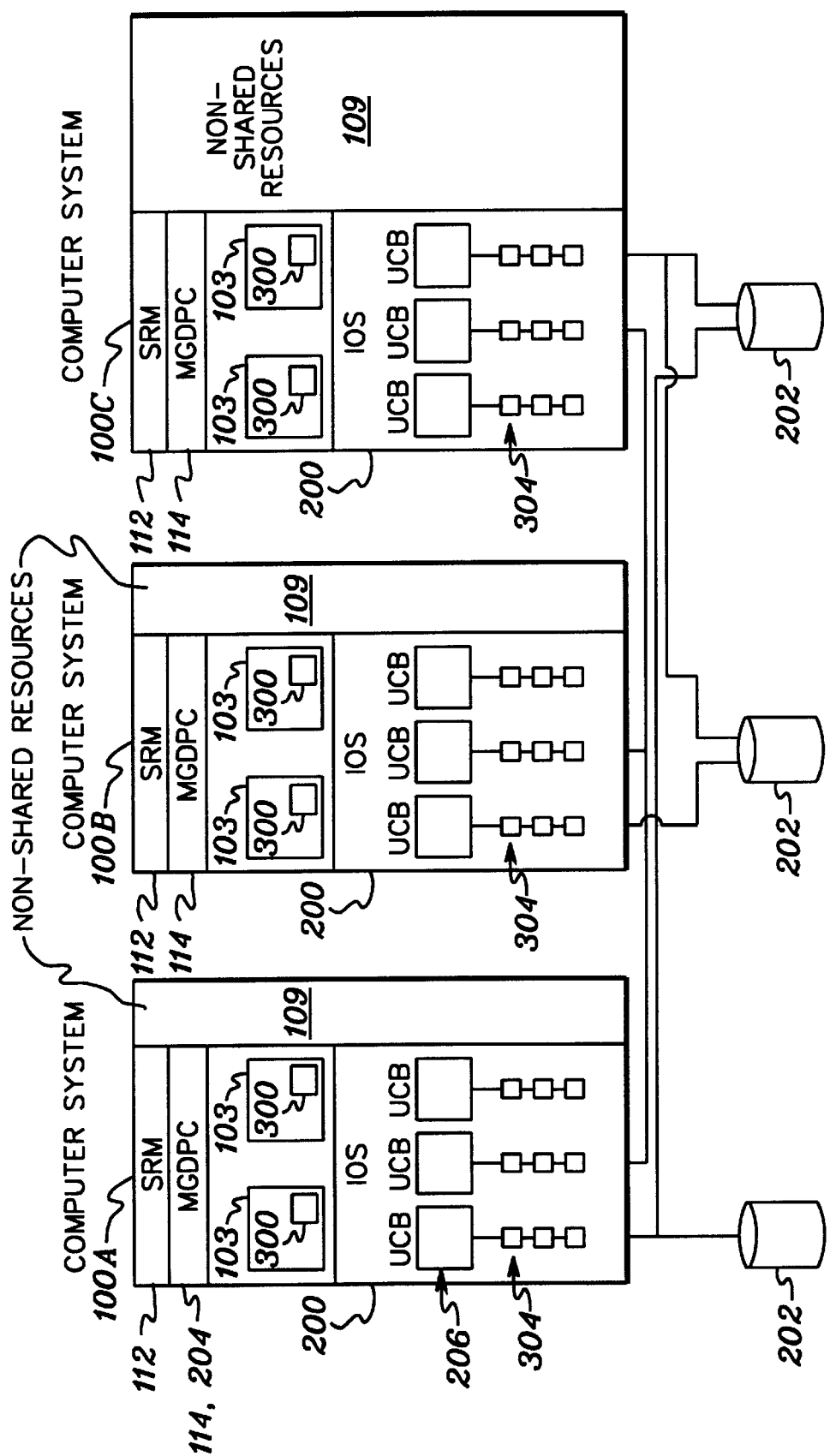
FIG. 2 is a diagram of an exemplary multisystem environment wherein each computer system employs both shared and nonshared resources.

As depicted in FIGS. 1–2, each shareable resource (202) connected to the computer systems has a control subsystem (200) that controls access to the shareable resource. The shareable resources need be neither identical nor shared among each and every one of the computer systems, as in the exemplary case of computer system 100-C. In one embodiment, the shareable resource comprises an input-output (hereinafter "IO") device (202) and an IO subsystem (IOS) (200) that controls access to the IO device. IOS (200) is a component of each operating system (101). IOS processes IO requests (304) for the IO device according to an IO priority (300), in one embodiment of the present invention. IOS includes unit control blocks ("UCB") (206) having the IO requests listed or queued up in order of their IO priorities.

Each computer system also includes non-shared resources (109) and a dispatcher (102) which is a component of the operating system (101) that selects a work unit (150) to be executed next by the computer system (100-A, 100-B, 100-C). IOS (200) itself is a piece of code that must be dispatched by the dispatcher (102) in order for the IOS to run on the processor. In one embodiment, dispatcher (102) dispatches work units (150) to, e.g., a processor (109) according to a dispatch priority (104). Other resource managers control access to other resources.

Work units (150) are the application programs that do the useful work that is the purpose of the computer system (100-A, 100-B, 100-C). The work units can make IO requests (304) to IOS (200) in order to access the IO devices (202). The work units that are ready to be executed are represented by a chain or queue of address space control blocks (hereinafter "ASCB") (103) in the memory of the operating system (101). Each ASCB has a field that contains the dispatch priority (104) and a field that contains the IO priority (300). The dispatch priority (104) is used by the dispatcher (102) to select for execution the highest priority work unit (150) from among those that are ready to be executed.

IO priority 300 is set by operation of the present invention and used by the IOS (200) to select for execution the highest priority IO request (304) from among those that are ready to be executed, that is, that are queued for the IO device (202). The IO priority is a controlled variable provided and managed by the present invention for meeting the stated performance goals (141) for operation of the computer systems, as members of the multisystem.

The present invention takes as input the goals (141) established by a multisystem administrator and stored on a data storage facility (140) accessible by each computer system being managed. The goals apply to work across all the computer systems (100-A, 100-B, 100-C) being dynamically managed. In accordance with the present invention, access to both the processor (109) and the IO devices (202) by the work units (150) is determined by how well the work units are achieving their goals. Included in each of the goals is a specification of the relative importance (108) of the goal. On each of the computer systems being managed, a workload manager (hereinafter "WLM") (105) on the operating system (101) reads the goals (141) into the computer system. Each of the goals causes the WLM on each computer system to establish a work class to which the individual work units (150) will be assigned.

When a work unit (150) executes, shows up, or starts running on any one of the computer systems (100-A, 100-B, 100-C), for example, in response to a user logging into or submitting a batch job to the particular computer system, the work unit is assigned to a work class. Then, the performance of that particular work unit factors into whether or not the particular work class is meeting the goals (141) of the work class.

In one exemplary embodiment, the goals (141) are illustrated as performance goals of two types: response time (110) (in seconds) and execution velocity (111) (in percent). Those skilled in the art will recognize that other goals, or additional goals, may be chosen without departing from the spirit or scope of this invention. Each work class is represented in the memory of the operating system by a class table entry (106). In the exemplary embodiment, the work class for each performance goal takes the form of a performance work class. Accordingly, each performance work class is represented in the memory of the operating system (101) by one of the class table entries.

FIG. 1 depicts the class table entry (106) records (in an internal representation) the specified goals (141) and other information relating to the performance work class. Other information stored in the class table entry includes the relative importance (108) (an input value) for the goal, the dispatch priority (107) (a controlled variable), IO priority (302) (a controlled variable), other controlled variables (132), the multisystem performance index (151) (computed value), the local performance index (152) (computed value), the response time goal (110) (an input value), the execution velocity goal (111) (an input value), the remote response time history (157) (measured data), the remote velocity history (158) (measured data), the sample data history (125) (measured data), and the response time history (126) (measured data).

The goal-driven performance controller of the system resource manager (hereinafter "SRM") (112) of operating system (101) performs sampling (113) and includes a multisystem goal-driven performance-controller (hereinafter "MGDPC") (114). The MGDPC performs the functions of measuring the achievement of the goals (141), selecting the performance work classes that need their performance improved, and improving the performance of the performance work classes by modifying the appropriate controlled variables (107, 302, 132) of the associated work units (150). In the preferred embodiment, the functioning of the MGDPC (114) is performed periodically, based on expiration of a timer.

In MGDPC (114), as depicted in FIG. 1, at "Calculate Performance Index" (115) a multisystem performance index (151) and a local performance index (152) are calculated for each class table entry (106), using the specified type of goal (110, 111). The multisystem performance index represents the performance of work units (150) associated with the work class across all the computer systems being managed. Also, the local performance index represents the performance of the work units associated with the work class on the local system. The resulting performance indexes are recorded in the corresponding class table entry (106) at (151) and (152). The concept of using a performance index as a method of measuring performance goal achievement is well-known.

At "Select Receiver" (116), a performance class is selected to receive a performance improvement in the order of the relative importance (108) of the goal (141) and the current value of the performance indexes (151, 152). The performance class so selected is referred to as the receiver class or receiver. The MGDPC (114) first uses the multisystem performance index (151) when choosing a receiver so its action has the largest possible impact on causing work units (150) to meet the goals across all the computer systems (100-A, 100-B, 100-C) being managed. When there is no action to take based on the multisystem performance index, the local performance index (152) is used to select a receiver that will most help the local system meet its goals. With respect to the resources (109, 202) (FIG. 2), MGDPC (114) performs additional checks, as described below.

At "Find Bottleneck" (117), state data is used to select resource bottlenecks to address. For each delay type, the class table entry (106) contains the number of samples encountering that delay type and a flag indicating whether the delay type has already been selected as a bottleneck during the present invocation of the MGDPC (114). The selection of a bottleneck to address is made by selecting the delay type with the largest number of samples that has not already been selected during the present invocation of the MGDPC. When a delay type is selected, the flag is set so that delay type is skipped if "Find Bottleneck" (117) is reinvoked during this invocation of the MGDPC. The type with the largest number of delay samples is located. The flag is set for the particular type and the particular type is returned. This invention adds IO Delay as a bottleneck to be addressed.

At "Fix" (118), the potential changes to the controlled variables (107, 302, 132) are considered. A performance work class is selected (123) for which a performance decrease can be made based on the relative goal importance (108) and the current value of the performance indexes (151, 152). The performance work class thus selected is referred to as the donor. Next, the proposed changes are assessed (124) for net value relative to the expected changes to the multisystem and local performance indexes for both the receiver and the donor class or donor for all the potentially changed controlled variables, including the IO priority (302) and the variables mentioned above and incorporated in copending application Ser. No. 08/383,168. A proposed change has net value if the result would yield more improvement for the receiver than harm to the donor relative to the goals. If the proposed change has net value, then the respective controlled variable is adjusted for both the donor and the receiver.

Changes to IO priorities (300) of the IO requests (304) of the work units (150) must propagate across all computer systems (100-A, 100-B, 100-C). For example, if work class A is running with IO priority two hundred fifty-three on one computer system, it must run with IO priority of two hundred fifty-three on all the computer systems in order to maintain this priority. Inconsistently maintained IO priorities would mean changes to the IO priorities could yield unpredictable effects. Any shared resource (202) (FIG. 2) would have similar requirements to keep the controlled variable in sync.

Each computer system (100-A, 100-B, 100-C) to be managed is connected to a data transmission mechanism (155) that allows the computer system to send data records to every other computer system. At (153) a data record describing the recent performance of each work class is sent to every other computer system. This concept is further described in the above-referenced and incorporated copending application Ser. No. 08/383,168.

The MGDPC (114) (FIG. 1) function is performed periodically, (once every ten seconds in a preferred embodiment) and is invoked via timer expiration. The functioning of the MGDPC provides a feedback loop for the incremental detection and correction of performance problems so as to make the operating system (101) adaptive and self-tuning.

The present invention coordinates across the multisystem changes to the IO priorities (300). In one preferred embodiment, after the MGDPC (114) (FIG. 1) on any computer system makes changes to the IO priorities, a further change to IO priorities will not be made for a number of time intervals. For example, such intervals could be six intervals, each interval being of ten seconds duration. These intervals serve to control the frequency of IO priority changes, to encourage each MGDPC to work on other matters, and to give enough time for feedback on the earlier changes to the priorities.

At (154), a remote data receiver receives performance data from remote systems asynchronously. This serialization with respect to IO priority changes is discussed further below and depicted in FIG. 9. The received data is placed in remote performance data histories (157, 158) for later processing by the MGDPC (114).

Figure 3A:
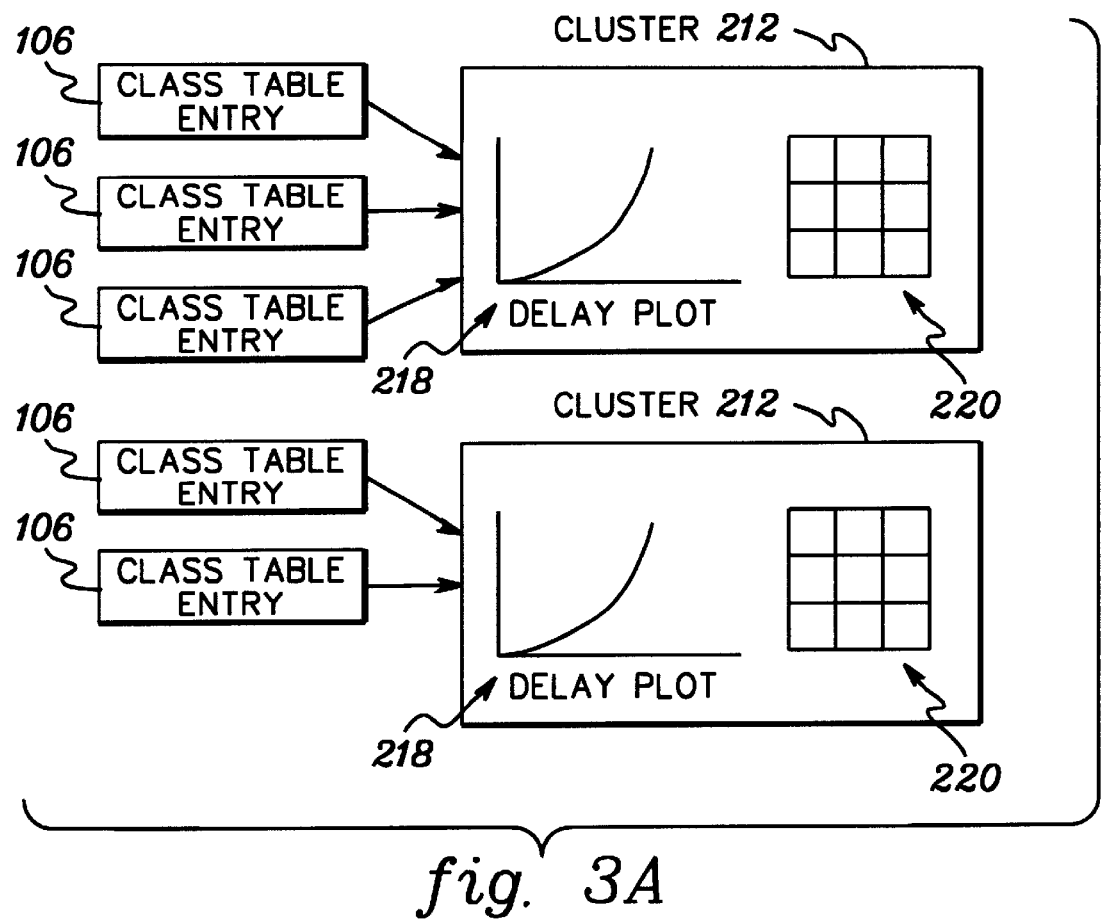
FIG. 3a is a representation of cluster information stored by each computer system of the multisystem in accordance with the present invention.

As depicted for computer system 100-A (FIG. 2), at any particular time only one MGDPC (114) may serve as a coordinating, grouping, and/or "clustering system" (204). As depicted in FIG. 3a and shown in phantom in FIGS. 4b–4c, this one "clustering system" determines disjoint sets or clusters (212) with respect to the IO devices (202) (FIG. 2).

Clustering system (204) represents special functioning of the MGDPC (114) to handle complexities involved in prioritizing use of IO devices (202) in the multisystem. Usually, not all work units (150) use the same IO devices. So, for the MGDPC to affect performance of the work units (150) using IO devices by changing IO priorities (300) of receivers with respect to donors, the MGDPC must know whether a certain donor actually affects the particular receiver. For example, if class 1 uses IO devices A, B, and C and class 2 uses IO devices X, Y, and Z, then changing the IO priority of class 1 will not affect the performance of class 2.

Conceptually, a "cluster" (212) (FIG. 3a) is a set of work classes competing for use of the same set, or subsets of the same set, of IO devices (202). Accordingly, MGDPC (114) can ascertain that work classes A and B use the IO devices of a first cluster and that work classes C, D, and E use the IO devices of a second cluster. Preferably, clustering system (204) dynamically builds these clustered relationships of work classes and IO devices periodically, for example, every ten minutes, based on how the clustering system sees use of the IO devices by the work classes.

Again, clustering system (204) determines the clusters (212) of IO devices (202). The remote data receiver (154) for the clustering system asynchronously receives data for the work classes from the remote systems. From this data, the clustering system is able to determine the clusters that are used by each work class in the multisystem, as discussed below.

The information about what IO devices (202) (FIG. 2) each work class is using can be gathered by sampling. Sampling builds a list for each work class that contains information about each IO device that work units (150) (FIG. 1) in the work class are using or waiting to use. The elements in the list are device use list elements (DULE). Each DULE contains a number identifying the IO device and the number of times the work units in the work class were seen using or waiting to use the IO device.

Every minute each non-clustering system, for example, computer systems (100-B, 100-C) illustrated in FIG. 2, will send the DULEs for each work class to the clustering system (204). The non-clustering systems know which system is the clustering system through the system name in a device clustering control table (hereinafter "DCCT") on each computer system. The clustering system will add the DULEs it receives to its work class DULE lists. This way, the IO device use lists on the clustering system represent how work units (150) (FIG. 1) in each work class are using IO devices across the entire multisystem.

Preferably every ten minutes, the clustering system consolidates the samples from each computer system to generate the clusters (212) (FIG. 3a) of the IO devices (202) (FIG. 2). The clustering system broadcasts these clusters to every other computer system in the multisystem. Thus, each computer system has the same information on multisystem topology as it makes priority decisions affecting every other computer system in the multisystem. The clustering interval of ten minutes stems from an assumption of fairly stable use of the IO devices.

In one preferred embodiment, only one MGDPC (114) at a time serves as the clustering system (204), which forms the clusters (212) (FIG. 3a) that every MGDPC consults when considering potential changes with respect to the IO priority (300) for IO requests (304) of work units (150). The illustrated embodiment depicts an instance of computer system (100-A) including the operating system (101) providing service in the form of clustering system (204). As a variation, the operating system of each computer system (100-A, 100-B, 100-C) might be capable of being designated as the clustering system.

The computer system that acquires an exclusive lock or clustering latch serves as the single clustering system in the multisystem at any given moment. Further, the DCCT contains a bit signalling whether the local system is the clustering system and an indication, as appropriate, of any remote clustering system. In an alternative embodiment, the capability to serve as the clustering system (204) can be omitted from MGDPC (200) for one or more of the operating systems (101).

Figure 5A:
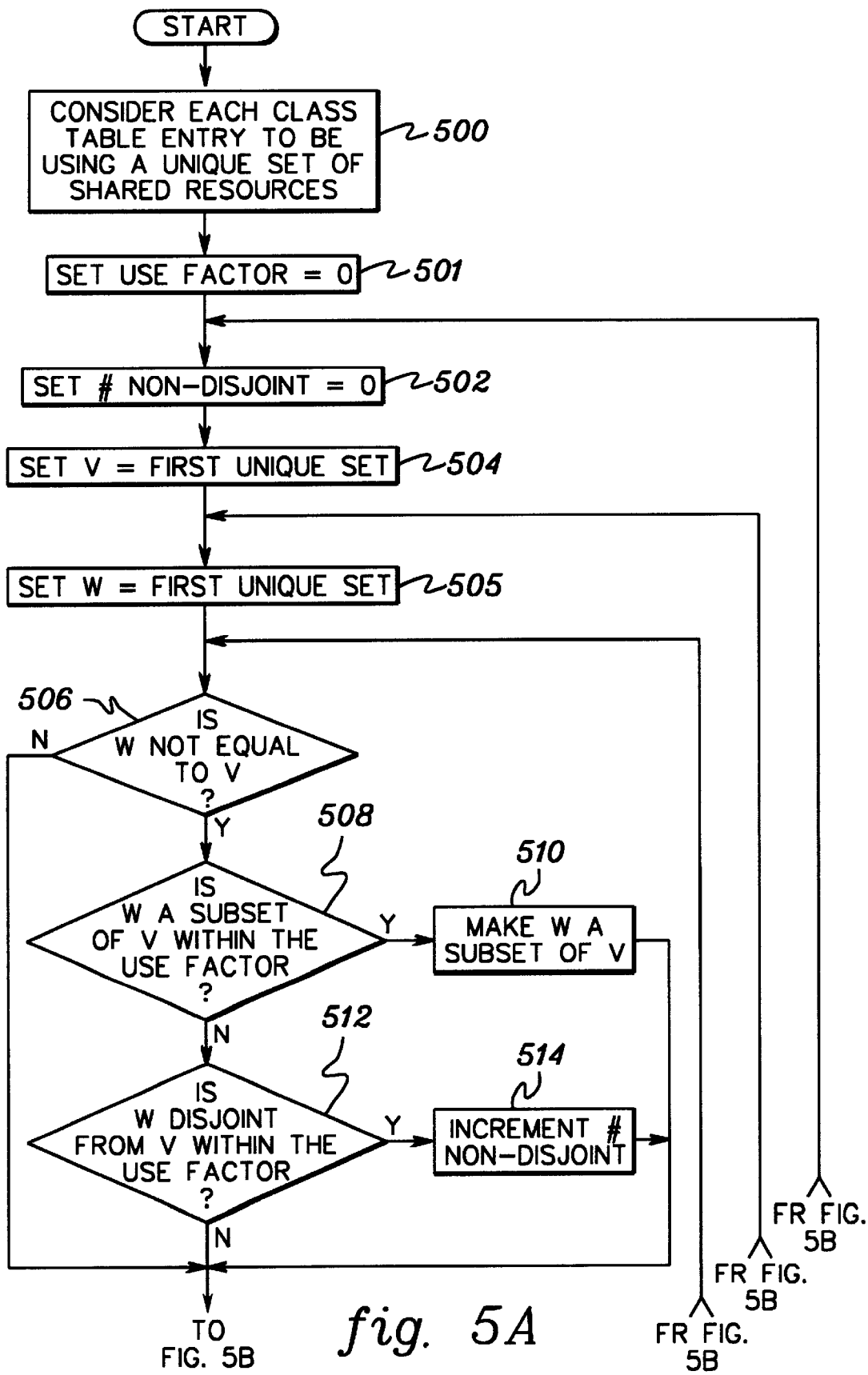
FIGS. 5a & 5b are a flowchart of one process for constructing clusters in accordance with one aspect of the shared resource management of the present invention.
Figure 5B:
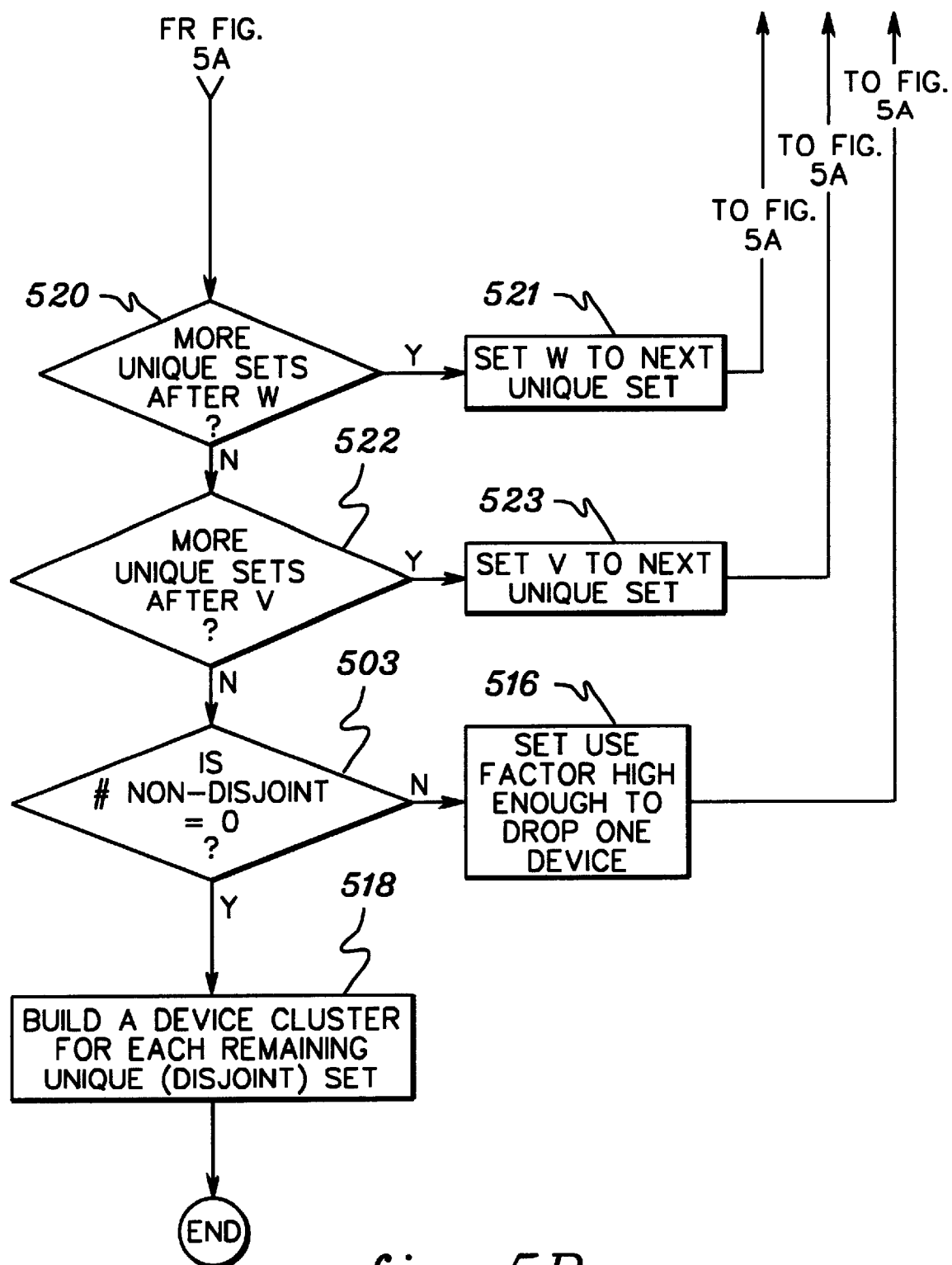

By way of further explanation, clustering system (204) (FIG. 2) executes the logic depicted in FIGS. 5a & 5b to form clusters (212) (FIG. 3a). One can understand the steps of the logic through examination of their application in the example of FIGS. 4a–4c. As mentioned above and depicted in FIG. 1, each work class is represented in the memory of the operating system (101) by a class table entry (106). In the example of FIGS. 4a–4c, each class table entry (106) (FIG. 1) stores representations of use (214) for each of five IO devices (202), only three of which are depicted in FIG. 2.

At STEP (500), each class table entry (106) is initially considered to be using a unique set of IO devices (202) (FIG. 2). The use factor (216) is reset, for instance, to zero at STEP (501). At STEP (502), an internal counter of the number of non-disjoint sets of IO devices between the work classes is set to zero. Work classes are purely disjoint when neither work class has a non-zero representation of use (214) of an IO device (202) (FIG. 2) for which the other work class also has a non-zero representation of use. The clustering system can also interpret or consider work classes disjoint by ignoring a certain conflicting representation of use (214). As discussed further below, if a pair of work classes would be purely disjoint but for use by only one work class of the pair of a certain IO device, evaluation of this use with respect to a use factor (216) determines whether the pair will nonetheless be interpreted as disjoint.

INQUIRY (503) represents a logical flow valve in an instance of the well-known DO-UNTIL loop computer programming structure. At INQUIRY (503), the clustering system (204) (FIG. 2) logically evaluates whether to return logical progression for looping through STEP (502) or exit the DO-UNTIL logical structure. The clustering system executes the logic interposed between STEP (502) and INQUIRY (503) until it considers all work classes not yet folded into subsets of the other work classes to be disjoint.

At INQUIRY (504), the logic ensures examination of each work class represented by a class table entry (106) (FIG. 1). By Steps and Inquiries (504–506, 508, 510, 512, 514, 520–523); the clustering system (204) (FIG. 2) considers any additional remaining work class in relation to the subject work class. As illustrated, clustering in accordance with the present invention is an iterative process. What were initiated as unique work classes are thoroughly scrutinized for folding into other work classes as subsets.

At STEP (510), if the additional work class is a pure subset of, and therefore purely non-disjoint with respect to, the subject work class, then the subset is formed. Therefore, this pair of work classes will share the same cluster (212) (FIG. 3a). Furthermore, the class table entry (106) for that additional work class preferably points to the subject work class as its parent or root in the cluster under construction. Accordingly, FIG. 4b depicts what were initiated as the second and fourth unique work classes as now non-unique subsets of the first developing cluster root work class because their respective representations of use (214) of the IO devices demonstrate they are subsets of such use by the first work class, STEP (510). Namely, commonality exists with respect to slots in their class table entries indicating their representations of use.

At INQUIRY and STEPS (512, 514, 516), the logic bolsters and solidifies the above-discussed premise of INQUIRY (503) of continued looping through (502) until the clustering system (204) (FIG. 2) considers all work classes to be disjoint not folded into subsets of the other work classes. FIG. 4c depicts the use factor (216) increased to the value of six in order to discount the representation of use (214) of five listed for the IO device (202) (FIG. 2) corresponding to the final slot of IO devices in the last class table entry (106) (FIG. 1). The work class corresponding to this last class table entry is then considered to be a subset of its preceding work class, into whom it is folded as a subset to develop a second cluster (212). In one embodiment, the illustrated logic can be modified so that after the use factor has been increased to the value of six, all the remaining unfolded sets are considered disjoint and interpreted as clusters. In any event, the clustering system at STEP (518) develops into clusters the sets of the IO devices of all remaining, unfolded work classes.

Figure 3B:
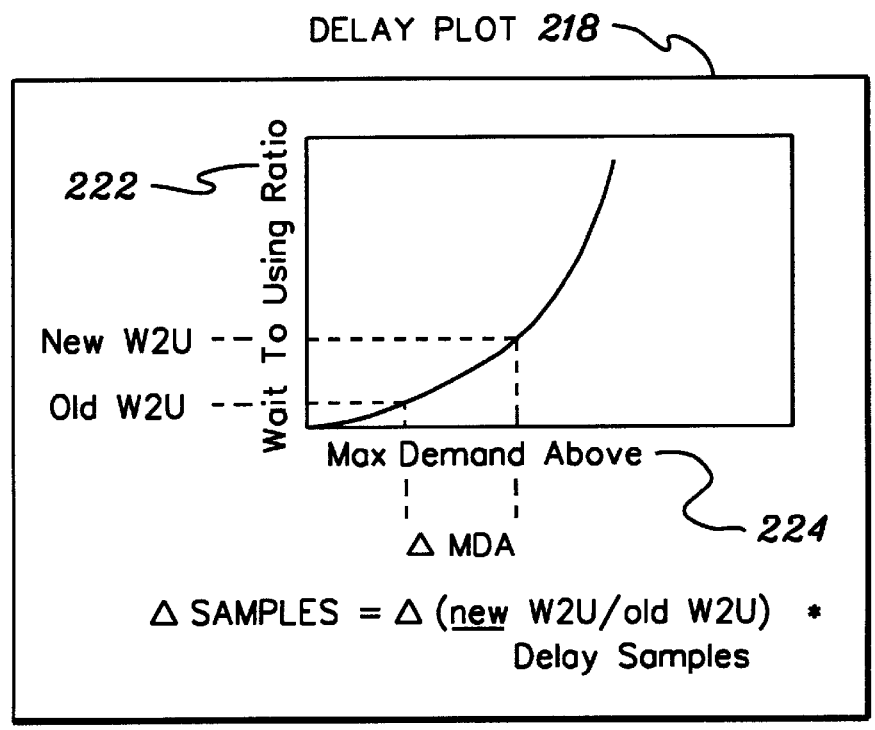

As depicted in FIGS. 3a–3b, the new clusters include a delay plot (218) copied from a cluster created in the previous clustering interval (if there was a previous interval), and having common use of the largest number of IO devices (202) (FIG. 2). The idea behind this procedure is to find for each new cluster a cluster most like it from the preceding clustering interval for use as a source in initializing the delay plot of the new cluster.

The delay plot plots wait-to-using ratio (222) versus maximum demand (224) and is used at "Fix" (118) (FIG. 1). In particular, the delay plot contains relatively long-term information that is used to project the effect of changing IO priorities (300) (FIG. 1) for the work units (150) (FIG. 1) of the work classes associated with the IO devices (202) (FIG. 2) of particular clusters. Initialization by copying of a previous delay plot, as mentioned above, advantageously leverages the relatively long-term character of the information. In one embodiment, every ten minutes this initialization occurs on the clustering system (204) (FIG. 2) after its broadcasting (STEPS (908, 917) (FIG. 6a–6b)) of the new clusters to all the other computer systems. Further, each of these other computer systems perform their own such initialization upon receipt of the new clusters.

The procedure for choosing the most similar preceding cluster ranks all the old clusters by number of samples collected for work classes common to the new cluster and each old cluster. Then, the procedure selects the old cluster having highest resulting rank for use as the source in initializing the delay plot (218) of the new cluster.

Improving performance by reducing the IO delay experienced by the receiver is next discussed.

Figure 6A:
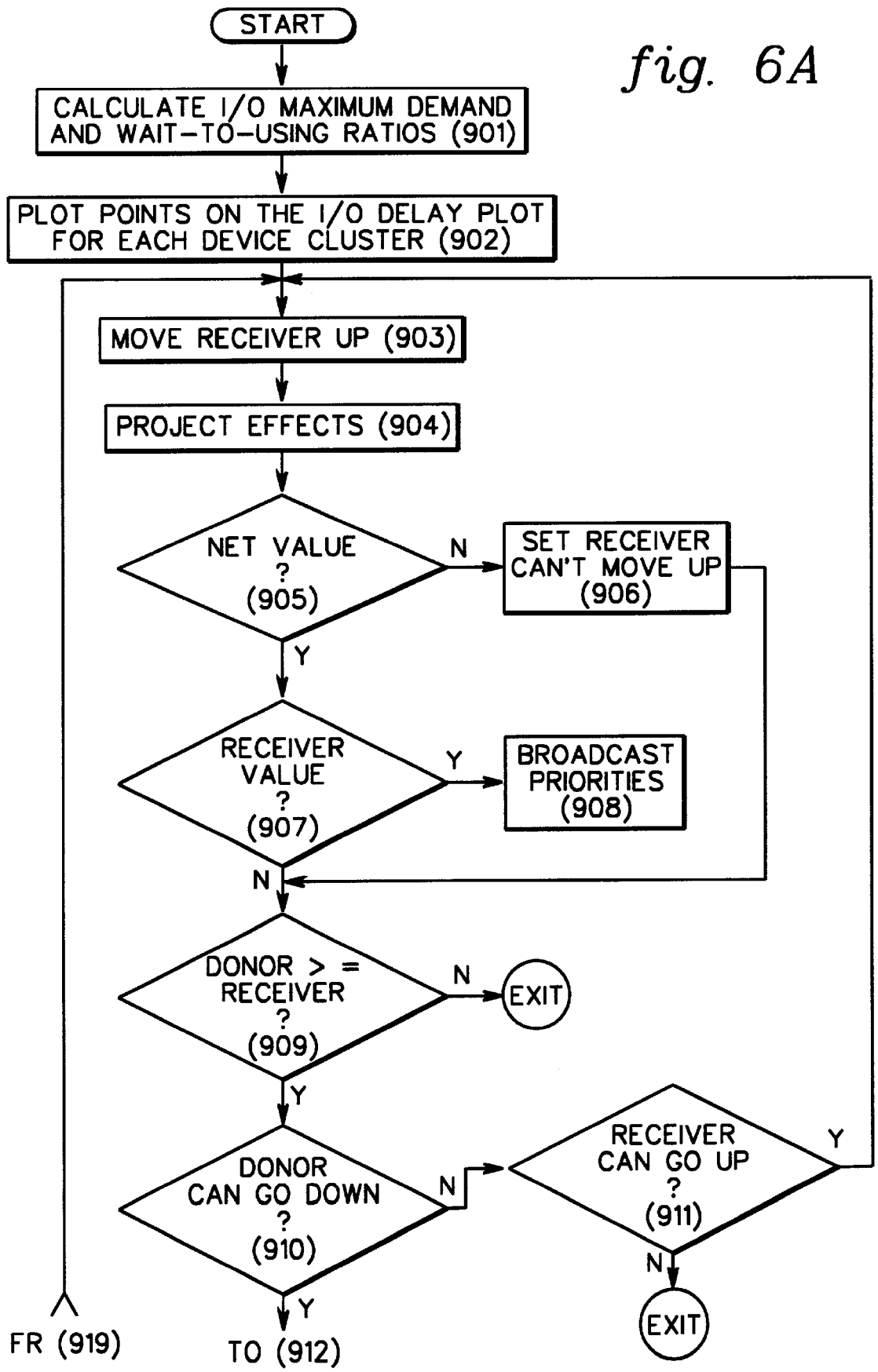
FIGS. 6a & 6b are a flowchart for assessing improving performance by adjusting shared resource priority.
Figure 6B:
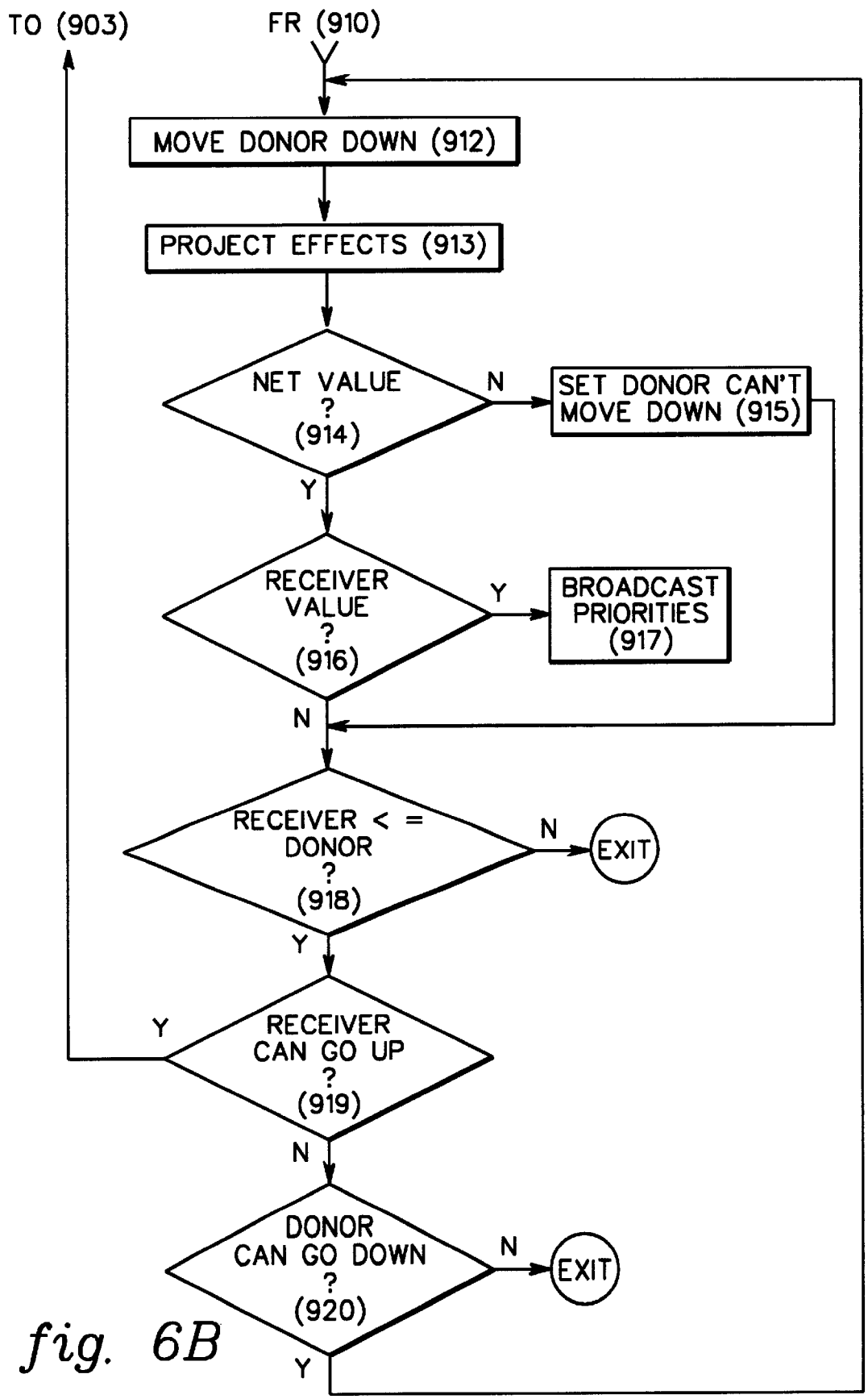
Figure 8:
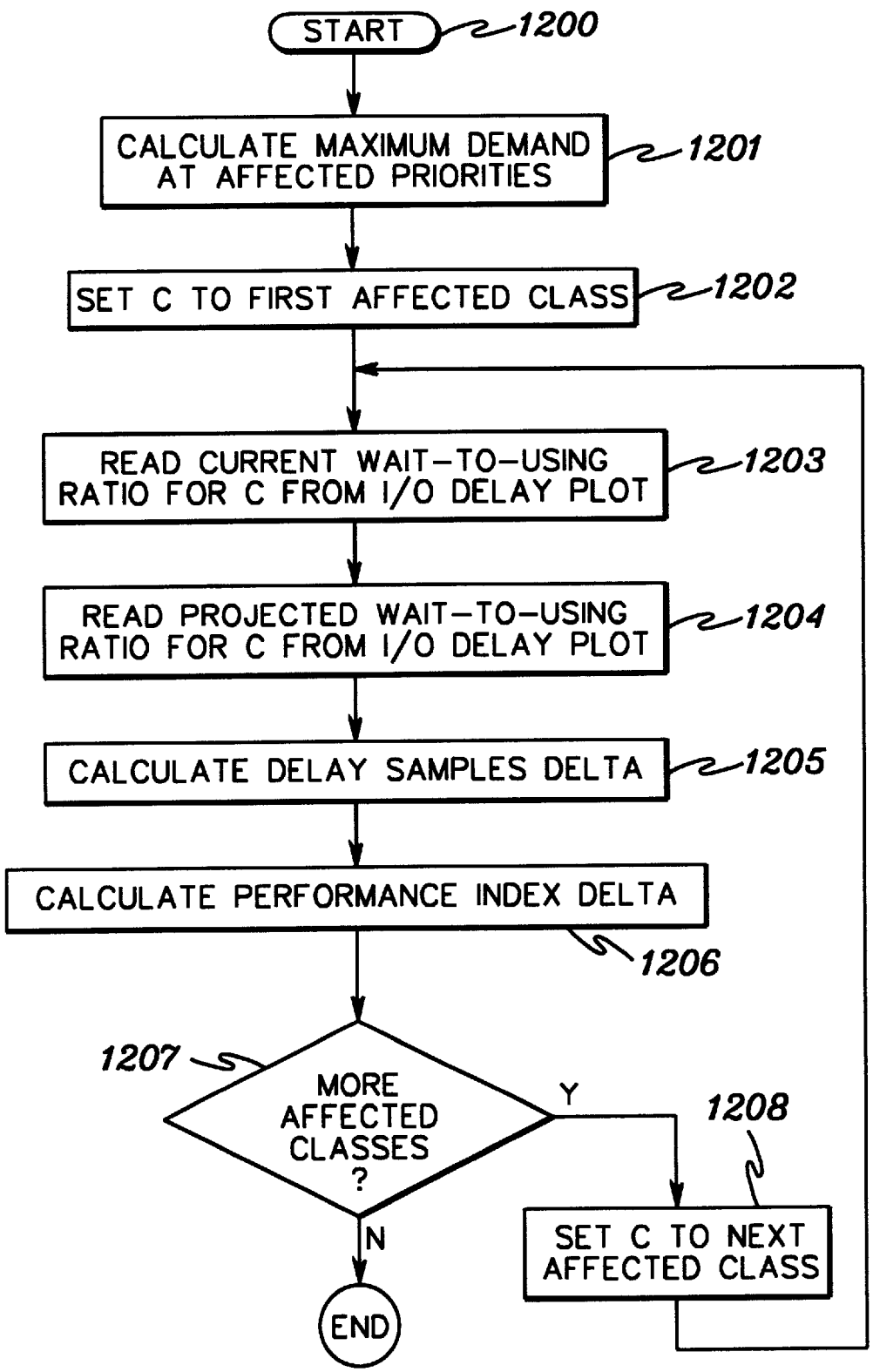
FIG. 8 illustrates the steps to project the effects of changing IO priorities.
Figure 9:
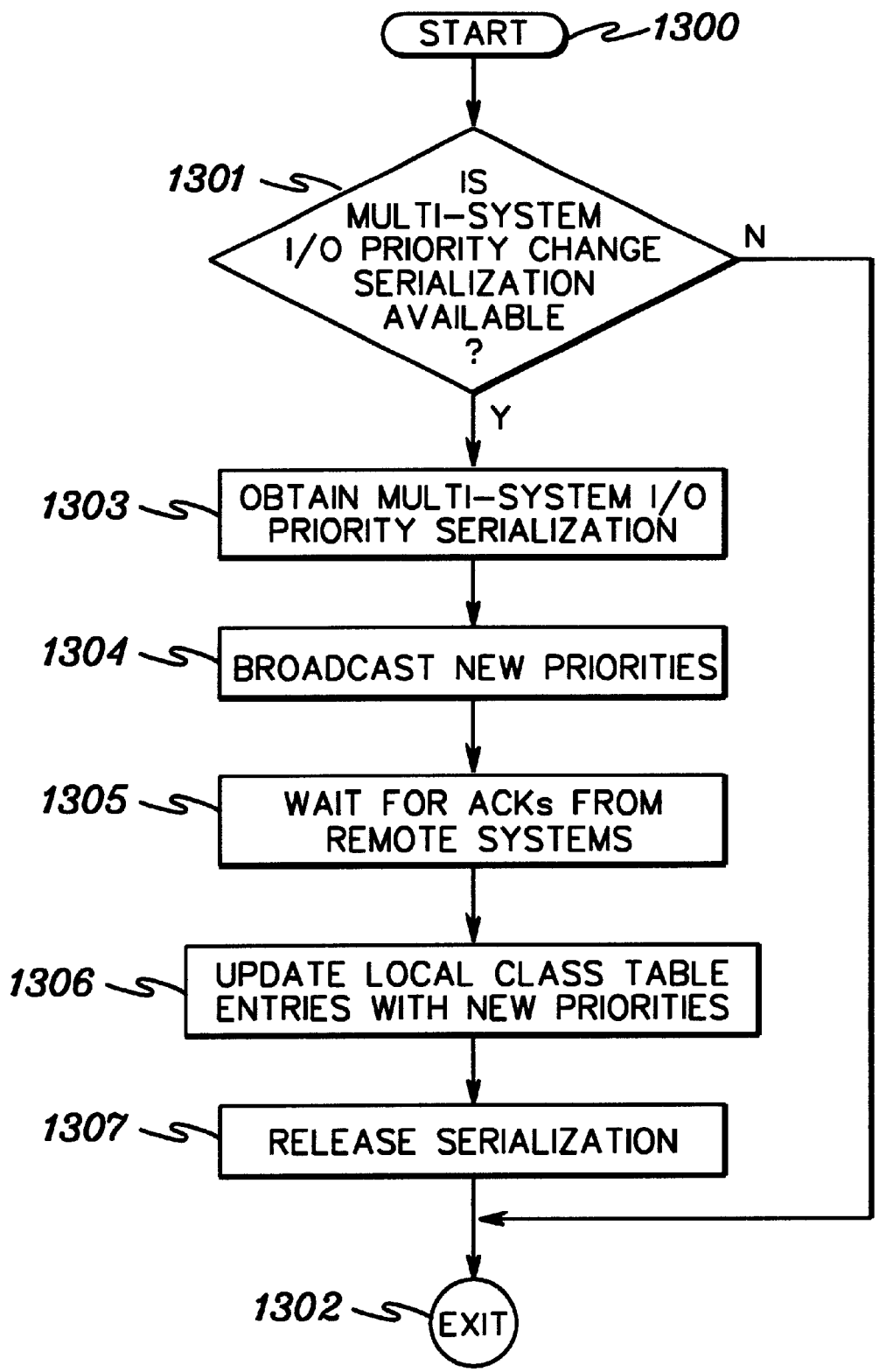
FIG. 9 is a flowchart of serialization for creating and broadcasting new IO priorities.

FIGS. 6a–6b illustrate a process to find a new set of IO priorities (300) (FIG. 1) to be used to improve the receiver's performance without inequitably harming the donor's performance. FIG. 8 provides the steps involved in making the performance index delta projections provided by fix (118) (FIG. 1) to assess net value (124) (FIG. 1). Once a new set of IO priorities has been found, the new priorities must be sent to all the other systems. FIGS. 9–10 describe this broadcast process.

Referring to FIGS. 6a & 6b, the maximum demand (224) (FIG. 3b) and wait-to-using ratio (222) (FIG. 3b) are calculated at STEP (901) for each work class and accumulated for all the work classes at each IO priority. These calculations are described below. A wait-to-using table (220) (FIG. 3a) of these values is constructed for each cluster (212) (FIG. 3a) where each row represents the IO priority (300) (FIG. 1) and the two columns are the IO wait-to-using ratio and the I/O maximum demand, accumulated for all the performance work classes in the cluster at the corresponding IO priority. The wait-to-using table is used to project new IO wait-to-use values for a new IO priority, as described below. The maximum demand and wait-to-using ratio are multisystem values, in accordance with the present invention. The formula for maximum demand is:

$$\text{I/O maximum demand percentage} = \frac{(\text{number of work units}) \times (\text{multisystem I/O-using samples}) \times (100)}{(\text{multisystem total samples}) - (\text{multisystem I/O delay samples})}$$

Maximum demand is the theoretical maximum percentage of time a work class can use the IO devices if it has no IO delay. The formula for wait-to-using is:

$$\text{I/O wait-to-ratio} = \frac{\text{multisystem I/O delay samples} * 16}{\text{multisystem I/O using samples}}$$

Another concept used in accessing IO priority changes is cumulative maximum demand. The cumulative maximum demand for an IO priority P is the sum of the IO maximum demands for all the work classes in a cluster having an IO priority greater than or equal to P.

The delay plot of FIG. 3b is used to predict the effect on the wait-to-using ratio of a work class when the IO priority of the work class is changed. The delay plot captures the relationship between cumulative IO maximum demand and IO wait-to-using ratio. There is one IO delay plot for each cluster (212) (FIG. 3a). The abscissa (X) is cumulative IO maximum demand and the ordinate (Y) value is IO wait-to-using ratio. At STEP (902) data is plotted on the delay plot for each cluster.

Figure 7:
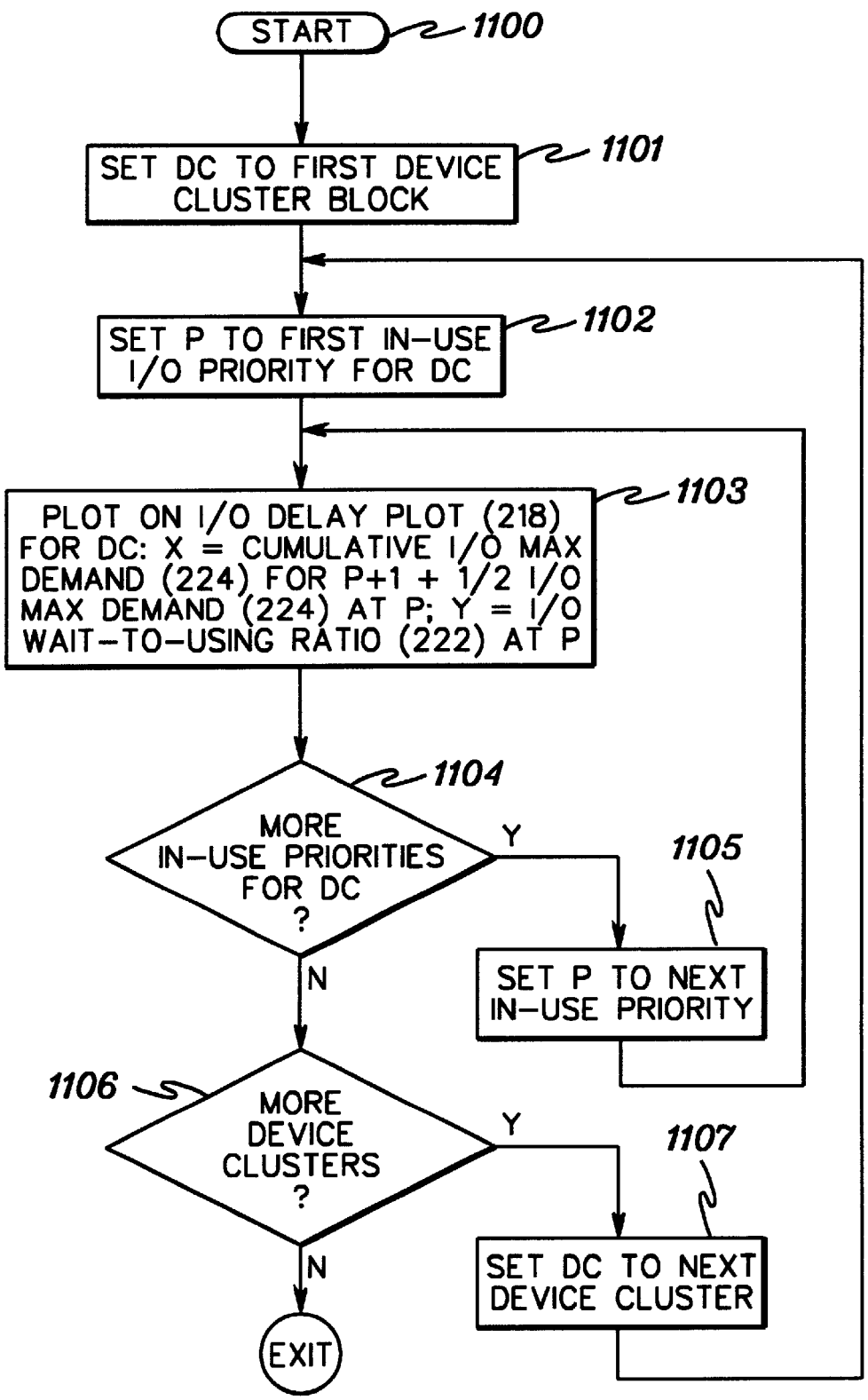
FIG. 7 is a flowchart for creating the delay plot of FIGS. 3a & 3b.

FIG. 7 shows the steps to plot data on this delay plot. One point is plotted on the delay plot for a cluster for each priority that is in-use for the cluster. A priority is considered in-use for a cluster if there is a work class within the cluster that has that IO priority (300) (FIG. 1). Data for the point is taken from the row in the wait-to-using table (220) (FIG. 3a) corresponding to the IO priority. The abscissa (X) value for a priority P is the cumulative IO maximum demand for priority P+1 plus half the IO maximum demand for priority P (224) (FIG. 3b). The reason that only half of the IO maximum demand at priority P is included in the abscissa value is that a class at priority P will be more delayed by work with an IO priority greater than P than other work with an equal IO priority. Work with an IO priority greater than P get access to IO devices (202) (FIG. 2) before work at priority P while competing work at the same IO priority get equal access to IO devices. The ordinate value for priority P is the IO waiting-to-using ratio (222) (FIG. 3b) for work at priority P.

As illustrated in FIGS. 6a–6b, STEPS and INQUIRIES (903–910) alternately assess increasing the IO priority (300) (FIG. 1) of the receiver (moving the receiver up) and decreasing the IO priority of the donor (moving the donor down) until the combination of moves produces sufficient receiver value or insufficient net value, "Assess Net Value" (124) (FIG. 1). STEPS (904, 913) project the effects of a move. Upon a finding of sufficient receiver value (INQUIRIES (907, 916)), the new IO priorities are broadcast to the other computer systems, STEPS (908, 917). In the event of failure of either net value check (INQUIRIES (905, 914)), secondary donors and receivers are selected to be moved up with the receiver or down with the donor for determination of whether that combination of moves will pass the net value check.

If the combination of moves passes the net value check (INQUIRIES (905, 914)), those secondary receivers and donors are moved along with the primary receiver and donors. The secondary donors and receivers are not found via the select donor means and the select receiver means; instead, secondary receivers are defined as those work classes in the same cluster (212) (FIG. 3a) as the primary receiver: 1) having an IO priority (300) (FIG. 1) below the IO priority of the primary receiver; and 2) that failed the net value check. Analogously; secondary donors are those work classes in the same cluster as the primary donor: 1) having an IO priority above the IO priority of the primary donor, and 2) that failed the net value check.

FIG. 8 illustrates the steps to project the effects of changing IO priorities. At (1201), the IO maximum demand of the performance work class whose IO priority is to be changed is subtracted from its "from" (current) IO priority and added to its "to" (proposed) IO priority. Next, the projected change in delay samples is calculated for each affected work class as follows. First (1203) the current IO wait-to-using ratio for an affected class's priority is read from, the IO delay plot. At (1204), the projected IO wait-to-using ratio for the class's new priority is read from the delay plot (218) (FIG. 3b) based on the cumulative maximum demand after the priority change. At (1205) the projected delay samples are calculated with the formula:

$$\text{(projected delay samples)} = \frac{\text{(actual delay samples)} \times \text{(projected wait-to-using)}}{\text{(current wait-to-using)}}$$

The projected delay samples are equal to the actual observed delay samples times the projected wait-to-using ratio divided by the current wait-to-using ratio. The delay sample delta is equal to the projected samples minus the actual samples.

At (1206) performance index deltas are calculated for IO priority changes as shown below. Note: these equations go both ways for receivers and donors because the IO delay sample deltas are signed numbers.

Response time goals:

$$\text{(projected multisystem response time delta)} = \frac{\text{(delay samples delta)} \times \text{(actual multisystem response time)}}{\text{(multisystem non-idle samples)}}$$

$$\text{(projected multisystem performance index delta)} = \frac{\text{(projected multisystem time delta)}}{\text{(goal)}}$$

(projected multisystem performance index delta)= (projected multisystem time delta)

Execution velocity goals:

$$\text{(new multisystem velocity)} = \frac{\text{(multisystem CPU-using)} + \text{(multisystem I/O using)}}{\text{(multisystem non-idle samples)} + \text{(delay samples delta)}}$$

$$\text{(multisystem performance index delta)} = \text{(current multisystem performance index)} - \frac{\text{(velocity goal)}}{\text{(new multisystem velocity)}}$$

One difference between IO priorities and the other resources managed by the MGDPC (114) (FIG. 1) is that IO priorities are for a multisystem resource. A given performance work class must have the same IO priority on each computer system (100-A, 100-B, 100-C). Therefore, when one system makes a change to IO priorities it must inform all the other computer systems.

FIG. 9 shows the steps in the process. At (1301), the computer system making the IO priority change attempts to get serialization to stop any other systems from making IO priority changes. If serialization is not available (1302), another computer system is in the process of making IO priority changes and the local computer system discards its proposed IO priority changes. If the serialization is available, the local computer system obtains the serialization (1303). At (1304), the local computer system broadcasts the new priorities to every other computer system.

FIG. 10 shows the data broadcast. This data is a simple table with one entry for each performance work class. This entry contains the name of the work class and the new IO priority of that work class. As depicted in FIG. 9, at (1305), the computer system waits to receive acknowledgements from each remote computer system that the remote computer system has received and implemented the new IO priorities. At (1306), the local computer system updates each of its class table entries (106) (FIG. 1) with its new IO priority (302) (FIG. 1). At (1307), the local computer system releases the serialization to allow other computer systems to make changes to IO priority. When each remote computer system receives new IO priorities, the receiving computer system updates each of its performance work class table entries with the new IO priority. The receiving computer system sends acknowledgement to the computer system making the IO priority changes that it has received the new IO priorities.

The flow diagrams depicted and described herein above are merely exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Further, the present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing resources for a workload comprising work units distributed across a plurality of data processing systems in accordance with a common performance standard, each of said plurality of systems having access to a stored representation of said performance standard, wherein said performance standard comprises a set of work classes, each work class having a performance goal of distinct goal type, said work units being organized into said work classes, each of which has a performance goal of one type of multiple goal types, and performing assigned work units in accordance with one or more control parameters for accessing the resources by said work units, said method comprising:

(a) measuring, on each of said plurality of systems, performance of the work units on said system to create local performance data;

(b) sending said local performance data from at least some systems of said plurality of systems to at least one other system in the plurality of systems;

(c) receiving, on at least one system of said plurality of systems, performance data from at least one other system of the plurality of systems to create remote performance data; and (d) responding, on said at least one system, to said local and remote performance data by adjusting at least one of said control parameters for accessing at least one shareable resources of the resources to modify the performance of said work units on said plurality of systems to achieve said distinct performance goal types of said set of work classes, wherein said at least one shareable resource is shared by at least some systems of the plurality of data processing systems.

2. A method of managing resources for a workload having a set of work classes across a plurality of data processing systems according to distinct goal types, said workload comprising work units organized into said set of work classes, each of said work classes having a performance goal comprising one of said goal types, each of said plurality of systems comprising a stored representation of said common set of work classes and performance goals, each of said plurality of systems having control parameters for accessing resources by said work units of said work classes, said method comprising:

(a) accessing said common set of work classes and performance goals by each system of said plurality of systems and creating system control data; and (b) managing the resources according to said common set of work classes and performance goals by:

(i) sampling states of said work units and creating sample data;

(ii) sending local performance data to at least one other system in said plurality of systems;

(iii) receiving performance data from at least one other system in said plurality of systems; and (iv) adjusting at least one control parameter of said control parameters for accessing at least one shareable resource of the resources in response to said sample data, said performance data from said at least one other system, and said system control data to cause a change to the performance of said work units to achieve said performance goals of said set of work classes, wherein said at least one shareable resource is shared by at least some systems of the plurality of data processing systems.

3. The method of claim 1, further comprising selecting, on at least one system of said at least some systems, a receiver class of said work classes whose one or more work requests of one or more work units are to be accorded improved access to at least one resource of shareable resources of the resources and non-shareable resources of the resources to achieve said common set of performance goals.

4. The method of claim 3, wherein said control parameters include a control variable for accessing said at least one type of shareable resources by the work requests of the work units of a work class of said work classes.

5. The method of claim 4, further comprising adjusting, on at least one system of said at least some systems, the control variable of a selected receiver class of said work classes whose one or more work requests of one or more work units are to be accorded improved access to at least one resource of shareable resources of the resources and non-shareable resources of the resources to cause a change to the performance of said work units to achieve said common set of performance goals.

6. The method of claim 5, further comprising broadcasting the adjusted control variable of said receiver class to each system of said at least some systems.

7. The method of claim 6, further comprising serializing the adjusting of the control variable by said at least some systems.

8. The method of claim 5, further comprising projecting effects of adjustments to the control variable on shareable resource delay; and wherein the adjusting of the control variable is responsive to said projected effects of adjustments to the control variable.

9. The method of claim 5, further comprising selecting, on at least one system of said at least some systems and responsive to the adjusting of the control variable, a donor class of said work classes whose one or more work requests of one or more work units are to be accorded degraded access to shareable resources in favor of said one or more work requests of one or more work units of said receiver class.

10. The method of claim 9, wherein the adjusting of the control variable further adjusts the control variable of said donor class.

11. The method of claim 10, further comprising broadcasting the adjusted control variable for said receiver class and the adjusted control variable for said donor class to said at least some systems.

12. The method of claim 5, wherein said at least one type of shareable resources includes shareable I/O devices, wherein said control parameters include I/O priority for accessing said shareable I/O devices by the work requests of the work units of a work class of said work classes.

13. The method of claim 5, wherein said sending of local performance data further comprises sending local shareable I/O device use data to a grouping system of said at least some systems;

wherein said receiving on said grouping system further comprises receiving said local shareable I/O device use data from at least one other system in said at least some systems;

further comprising associating, by said grouping system, each work class of the work classes on said at least some systems with one set of shareable I/O devices of a plurality of sets of shareable I/O devices of shareable I/O devices of said shareable resources to create association data; and wherein on at least one system of said at least some systems said responding is further responsive to the association data for the adjusting of the control variable.

14. The method of claim 13, further comprising selecting, on at least one system of said at least some systems and responsive to the adjusting of the control variable and the association data, a donor class of said work classes whose one or more work requests of one or more work units are to be accorded degraded access to said shareable I/O devices in favor of said one or more work requests of one or more work units of said receiver class.

15. The method of claim 14, wherein the adjusting of the control variable adjusts the control variable of said receiver class and the control variable of said donor class in response to the association data.

16. The method of claim 15, further comprising broadcasting the control variables of said receiver and donor classes to said at least some systems.

17. The method of claim 13, further comprising designating only one designated system of said at least some systems as said grouping system at any one time.

18. The method of claim 1, wherein said adjusting of at least one control parameter comprises;
calculating a multisystem performance index for each work class of said work classes across said plurality of systems;
calculating a local performance index for each work class of said work classes;
responding to said calculated multisystem performance indexes and said calculated local performance indexes by selecting a receiver class of said work classes whose one or more work requests of one or more work units are to be accorded improved access to at least one resource of shareable resources of the resources and non-shareable resources of the resources;
responding to said sample data by identifying a resource bottleneck affecting said receiver class; and
responding to said identifying of said resource bottleneck by adjusting a particular control parameter.

19. The method of claim 18, wherein said resource bottleneck is a shareable resource bottleneck;
wherein said control parameters include a control variable for accessing said at least one type of shareable resources by the work requests of the work units of a work class of said work classes; and
wherein said adjusting of said particular control parameter adjusts the control variable in response to said identifying of the shareable resource bottleneck.

20. The method of claim 19, further comprising broadcasting the adjusted control variable of said receiver class to each system of said at least some systems.

21. The method of claim 20, further comprising serializing the adjusting of the control variable by said at least some systems; and
serializing said broadcasting.

22. The method of claim 18, further comprising projecting effects on shareable resource delay of adjustments to a control variable for accessing said at least one type of shareable resources by the work requests of the work units of a work class of said work classes; and
wherein the adjusting of the control variable is responsive to said projected effects of adjustments to the control variable.

23. The method of claim 18, further comprising selecting, on at least one system of said at least some systems and responsive to the adjusting of said particular control parameter, a donor class of said work classes whose one or more work requests of one or more work units are to be accorded degraded access to shareable resources in favor of said one or more work requests of one or more work units of said receiver class.

24. The method of claim 23, wherein said resource bottleneck is a shareable resource bottleneck;
wherein said control parameters include a control variable for accessing said at least one type of shareable resources by the work requests of the work units of a work class of said work classes; and
wherein the adjusting of said particular control parameter adjusts the control variable for said receiver class and the control variable for said donor class.

25. The method of claim 24, further comprising broadcasting the adjusted control variable for said receiver class and the adjusted control variable for said donor class to said at least some systems.

26. The method of claim 18, wherein said at least one type of shareable resources includes shareable I/O devices, wherein said control parameters include I/O priority for accessing said shareable I/O devices by the work requests of the work units of a work class of said work classes.

27. The method of claim 18, wherein said sending of local performance data further comprises sending local shareable I/O device use data to a grouping system of said at least some systems;
wherein said receiving on said grouping system further comprises receiving said local shareable I/O device use data from at least one other system in said at least some systems;
further comprising associating, by said grouping system, each work class of the work classes on said at least some systems with one set of shareable I/O devices of a plurality of sets of shareable I/O devices of shareable I/O devices of said shareable resources to create association data; and
wherein on at least one system of said at least some systems said responding is further responsive to the association data for the adjusting of said particular control parameter.

28. The method of claim 27, further comprising selecting, on at least one system of said at least some systems and responsive to the adjusting of said particular control parameter and the association data, a donor class of said work classes whose one or more work requests of one or more work units are to be accorded degraded access to said shareable I/O devices in favor of said one or more work requests of one or more work units of said receiver class.

29. The method of claim 28, wherein said resource bottleneck is a shareable resource bottleneck;
wherein said control parameters include a control variable for accessing said shareable I/O devices by the work requests of the work units of a work class of said work classes; and
wherein said adjusting of said particular control parameter adjusts the control variable of said receiver class and the control variable of said donor class in response to said identifying of the shareable resource bottleneck and the association data.

30. The method of claim 29, further comprising broadcasting the control variables of said receiver and donor classes to said at least some systems.

31. The method of claim 27, further comprising designating only one designated system of said at least some systems as said grouping system at any one time.

32. Apparatus for managing a workload comprising work units distributed across a plurality of data processing systems in accordance with a common performance standard, each of said plurality of systems having access to a stored representation of said performance standard, wherein said performance standard comprises a set of work classes, each work class having a performance goal of distinct goal type, said work units being organized into said work classes, each of which has a performance goal of one type of multiple goal types, and performing assigned work units in accordance with one or more control parameters for accessing resources by said work units, the apparatus comprising:

(a) on each of said plurality of systems, means for measuring performance of the work units on said system to create local performance data;

(b) on at least some systems of said plurality of systems, means for sending said local performance data to at least one other system in the plurality of systems;

(c) on at least one system of said plurality of systems, means for receiving performance data from at least one other system of the plurality of systems to create remote performance data; and (d) on said at least one system, means responsive to said local and remote performance data for adjusting at least one of said control parameters for accessing at least one shareable resources of the resources to modify the performance of said work units on said plurality of systems to achieve said distinct performance goal types of said set of work classes, wherein said at least one shareable resource is shared by at least some systems of the plurality of data processing systems.

33. Apparatus for managing a workload having a set of work classes across a plurality of data processing systems according to one or more distinct goal types, said workload comprising work units organized into said set of work classes, each of said work classes having a performance goal comprising one of said goal types, each of said plurality of systems having access to a stored representation of said work classes and performance goals and creating system control data, each of said plurality of systems having control parameters for accessing resources by said work units of said work classes, said apparatus comprising, on each of said plurality of systems:

system resource manager means for managing the resources according to said set of work classes and performance goals, said system resource manager means comprising:

sampler means for sampling states of said work units and creating sample data;

send data means for sending local performance data to at least one other system in said plurality of systems;

remote data receiver means for receiving performance data from at least one other system in said plurality of systems; and multisystem goal-driven performance-controller means responsive to said sample data, said performance data from said at least one other system, and said system control data for adjusting at least one control parameter of said control parameters for accessing at least one shareable resource of the resources to cause a change to the performance of said work units to achieve said performance goals of said set of work classes, wherein said at least one shareable resource is shared by at least some systems of the plurality of data processing systems.

34. The apparatus of claim 33, further comprising, on each system of said at least some systems, select receiver means for selecting a receiver class of said work classes whose one or more work requests of one or more work units are to be accorded improved access to at least one resource of shareable resources of the resources and non-shareable resources of the resources to achieve said common set of performance goals.

35. The apparatus of claim 33, wherein said control parameters include a control variable for accessing said at least one type of shareable resources by the work requests of the work units of a work class of said work classes.

36. The apparatus of claim 35, further comprising, on each system of said at least some systems, fix means for adjusting said control parameters, said fix means comprising at least one parameter adjustment means for adjusting the control variable of a selected receiver class of said work classes whose one or more work requests of one or more work units are to be accorded improved access to at least one resource of shareable resources of the resources and non-shareable resources of the resources to cause a change to the performance of said work units to achieve said common set of performance goals.

37. The apparatus of claim 46, further comprising, on each system of said at least some systems, means for broadcasting the adjusted control variable of said receiver class to each system of said at least some systems.

38. The apparatus of claim 37, further comprising, on each system of said at least some systems, means for serializing the adjusting of the control variable by said parameter adjustment means of said at least some systems.

39. The apparatus of claim 36, wherein said fix means further comprises projection means for projecting effects of adjustments to the control variable on shareable resource delay; and wherein said parameter adjustment means is responsive to said projected effects of adjustments to the control variable.

40. The apparatus of claim 36, further comprising, on each system of said at least some systems, select donor means, responsive to said fix means, for selecting a donor class of said work classes whose one or more work requests of one or more work units are to be accorded degraded access to shareable resources in favor of said one or more work requests of one or more work units of said receiver class.

41. The apparatus of claim 40, wherein said parameter adjustment means further adjusts the control variable of said donor class.

42. The apparatus of claim 41, further comprising, on each system of said at least some systems, means for broadcasting the adjusted control variable for said receiver class and the adjusted control variable for said donor class to said at least some systems.

43. The apparatus of claim 36, wherein said at least one type of shareable resources includes shareable I/O devices, wherein said control parameters include I/O priority for accessing said shareable I/O devices by the work requests of the work units of a work class of said work classes.

44. The apparatus of claim 36, wherein said means for sending local performance data further comprises means for sending local shareable I/O device use data to a grouping system of said at least some systems;

wherein said means for receiving on said grouping system further comprises means for receiving said local shareable I/O device use data from at least one other system in said at least some systems;

wherein said grouping system further comprises means for associating each work class of the work classes on said at least some systems with one set of shareable I/O devices of a plurality of sets of shareable I/O devices of shareable I/O devices of said shareable resources to create association data; and wherein on each system of said at least some systems said means responsive is further responsive to the association data for said adjusting.

45. The apparatus of claim 44, further comprising, on each system of said at least some systems, select donor means, responsive to said fix means and the association data, for selecting a donor class of said work classes whose one or more work requests of one or more work units are to be accorded degraded access to said shareable I/O devices in favor of said one or more work requests of one or more work units of said receiver class.

46. The apparatus of claim 45, wherein said parameter adjustment means on each system of said at least some systems adjusts the control variable of said receiver class and the control variable of said donor class in response to the association data.

47. The apparatus of claim 46, further comprising, on each system of said at least some systems, means for broadcasting the control variables of said receiver and donor classes to said at least some systems.

48. The apparatus of claim 44, further comprising means for designating only one designated system of said at least some systems as said grouping system at any one time.

49. The apparatus of claim 33, wherein said multisystem goal-driven performance-controller means comprises:

multisystem performance index calculation means for calculating a multisystem performance index for each work class of said work classes across said plurality of systems;

local performance index calculation means for calculating a local performance index for each work class of said work classes;

select receiver means responsive to said calculated multisystem performance indexes and said calculated local performance indexes for selecting a receiver class of said work classes whose one or more is work requests of one or more work units are to be accorded improved access to at least one resource of shareable resources of the resources and non-shareable resources of the resources;

find bottleneck means responsive to said sample data for identifying a resource bottleneck affecting said receiver class; and fix means for adjusting said control parameters, said fix means comprising at least one parameter adjustment means, each of said parameter adjustment means being responsive to said identifying said resource bottleneck and adjusting a particular control parameter.

50. The apparatus of claim 49, wherein said resource bottleneck is a shareable resource bottleneck;

wherein said control parameters include a control variable for accessing said at least one type of shareable resources by the work requests of the work units of a work class of said work classes; and wherein said parameter adjustment means adjusts the control variable for said receiver class in response to said identifying of the shareable resource bottleneck.

51. The apparatus of claim 50, further comprising, on each system of at least some systems of said plurality of systems, means for broadcasting the adjusted control variable of said receiver class to each system of said at least some systems.

52. The apparatus of claim 51, further comprising means for serializing the adjusting of the control variable by said parameter adjustment means of said at least some systems.

53. The apparatus of claim 49, wherein said fix means further comprises projection means for projecting effects on shareable resource delay of adjustments to a control variable for accessing said at least one type of shareable resources by the work requests of the work units of a work class of said work classes; and wherein each of said parameter adjustment means is further responsive to said projected effects of adjustments to the control variable.

54. The apparatus of claim 49, wherein said multisystem goal-driven performance-controller means further comprises select donor means, responsive to said fix means, for selecting a donor class of said work classes whose one or more work requests of one or more work units are to be accorded degraded access to shareable resources in favor of said one or more work requests of one or more work units of said receiver class.

55. The apparatus of claim 54, wherein said resource bottleneck is a shareable resource bottleneck;

wherein said control parameters include a control variable for accessing said at least one type of shareable resources by the work requests of the work units of a work class of said work classes; and wherein said parameter adjustment means adjusts the control variable for said receiver class and the control variable for said donor class in response to said identifying of the shareable resource bottleneck.

56. The apparatus of claim 55, further comprising, on each system of at least some systems of said plurality of systems, means for broadcasting the adjusted control variable for said receiver class and the adjusted control variable for said donor class to said at least some systems.

57. The apparatus of claim 49, wherein said at least one type of shareable resources includes shareable I/O devices, wherein said control parameters include I/O priority for accessing said shareable I/O devices by the work requests of the work units of a work class of said work classes.

58. The apparatus of claim 49, wherein said send data means on said system resource manager means on at least some systems of said plurality of systems further comprises means for sending local shareable I/O device use data to a grouping system of said at least some systems;

wherein said remote data receiver means on said grouping system further comprises means for receiving said local shareable I/O device use data from at least one other system in said at least some systems;

wherein said multisystem goal-driven performance-controller means on said grouping system further comprises means for associating each work class of the work classes on said at least some systems with one set of shareable I/O devices of a plurality of sets of shareable I/O devices of shareable I/O devices of said shareable resources to create association data; and wherein on said multisystem goal-driven performance-controller means on each system of said at least some systems said means responsive is further responsive to the association data for said adjusting.

59. The apparatus of claim 58, wherein said multisystem goal-driven performance-controller means on each system of said at least some systems further comprises select donor means, responsive to said fix means and the association data, for selecting a donor class of said work classes whose one or more work requests of one or more work units are to be accorded degraded access to said shareable I/O devices in favor of said one or more work requests of one or more work units of said receiver class.

60. The apparatus of claim 59, wherein said resource bottleneck is a shareable resource bottleneck;

wherein said control parameters include a control variable for accessing said shareable I/O devices by the work requests of the work units of a work class of said work classes; and wherein said parameter adjustment means on each system of said at least some systems adjusts the control variable of said receiver class and the control variable of said donor class in response to said identifying of the shareable resource bottleneck and the association data.

61. The apparatus of claim 60, further comprising, on each system of said at least some systems, means for broadcasting the control variables of said receiver and donor classes to said at least some systems.

62. The apparatus of claim 58, further comprising means for designating only one designated system of said at least some systems as said grouping system at any one time.

* * * * *

UNITED STATES PATENT AND TRADEMARK OFFICE
CERTIFICATE OF CORRECTION

PATENT NO. : 6,393,455 B1
DATED : May 21, 2002
INVENTOR(S) : Eilert et al.

It is certified that error appears in the above-identified patent and that said Letters Patent is hereby corrected as shown below:

Column 1,
Lines 50 & 51, delete "application Ser. No. 08/383,168, filed Feb. 3, 1995, of" and insert -- Pat. No. 5,675,739 to --
Lines 58 & 59, delete "appliation Ser. No. 08/488,374, filed Jun. 7, 1995, of" and insert -- Pat. No. 6,249,800 to --

Column 6,
Line 36, delete "," after the word "periodically"
Line 52, insert a new sentence at the end of the paragraph -- This serialization with respect to IO priority changes is discussed further below and depicted in Fig. 9. --

Column 7,
Line 36, insert -- , -- after the word "minute"

Column 8,
Line 46, delete "(504)" and insert -- (506) --

Column 9,
Line 41, delete "(FIG. 6a-6b))" and insert -- (FIGS. 6a-6b)) --

Column 11,
Line 22, delete "," and insert -- ; --
Line 30, insert -- , -- after the word "First"

Column 17,
Line 26, delete "s" on the word resources in the first instance

UNITED STATES PATENT AND TRADEMARK OFFICE
CERTIFICATE OF CORRECTION

PATENT NO.   : 6,393,455 B1
DATED        : May 21, 2002
INVENTOR(S)  : Eilert et al.

It is certified that error appears in the above-identified patent and that said Letters Patent is hereby corrected as shown below:

<u>Column 18,</u>
Line 22, delete "46" and insert -- 36 --

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,393,455 B1
DATED : May 21, 2002
INVENTOR(S) : Eilert et al.

It is certified that error appears in the above-identified patent and that said Letters Patent is hereby corrected as shown below:

<u>Column 6,</u>
Line 36, delete "," after the word "periodically"
Line 52, insert a new sentence at the end of the paragraph -- This serialization with respect to IO priority changes is discussed further below and depicted in Fig. 9. --

<u>Column 7,</u>
Line 36, insert -- , -- after the word "minute"

<u>Column 8,</u>
Line 46, delete "(504)" and insert -- (506) --

<u>Column 9,</u>
Line 41, delete "(FIG. 6a-6b))" and insert -- (FIGS. 6a-6b)) --

<u>Column 17,</u>
Line 26, delete "s" on the word resources in the first instance <u>Column 18,</u>
Line 22, delete "46" and insert -- 36 --

This certificate supersedes Certificate of Correction issued January 21, 2003.

Signed and Sealed this

Twenty-sixth Day of August, 2003

JAMES E. ROGAN
*Director of the United States Patent and Trademark Office*